(12) United States Patent
Stamps et al.

(10) Patent No.: US 8,029,371 B2
(45) Date of Patent: Oct. 4, 2011

(54) ROTARY-WING AIRCRAFT TORQUE COUPLING WITH PAD BEARINGS

(75) Inventors: Frank B. Stamps, Colleyville, TX (US); Richard Rauber, Arlington, TX (US); David Popelka, Colleyville, TX (US); Pat Tisdale, Roanoke, TX (US); Tom Campbell, Keller, TX (US); James Lee Braswell, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 318 days.

(21) Appl. No.: 12/376,979

(22) PCT Filed: Aug. 17, 2006

(86) PCT No.: PCT/US2006/032182
§ 371 (c)(1),
(2), (4) Date: Feb. 10, 2009

(87) PCT Pub. No.: WO2008/020848
PCT Pub. Date: Feb. 21, 2008

(65) Prior Publication Data
US 2010/0009764 A1    Jan. 14, 2010

(51) Int. Cl.
*F16D 3/00* (2006.01)
(52) U.S. Cl. .................. 464/85; 464/87; 416/134 A
(58) Field of Classification Search ............ 464/81, 464/83, 85, 87; 416/132 R, 134 R, 134 A, 416/135; 244/60
See application file for complete search history.

(56) References Cited

U.S. PATENT DOCUMENTS

| | | | | |
|---|---|---|---|---|
| 3,778,189 A | * | 12/1973 | Ferris | 416/134 A |
| 3,782,854 A | * | 1/1974 | Rybicki | 416/134 A |
| 3,965,825 A | * | 6/1976 | Sherrick | |
| 4,105,266 A | * | 8/1978 | Finney | 416/134 A |
| 4,142,833 A | * | 3/1979 | Rybicki et al. | 416/134 A |

(Continued)

FOREIGN PATENT DOCUMENTS
EP    1752671    * 2/2007

OTHER PUBLICATIONS

Weisstein, Eric W. "Focus." Wolfram Math World. Jun. 29, 2006. Web. Feb. 14, 2011. <http://replay.waybackmachine.org/20060629132438/http://mathworld.wolfram.com/Focus.html>.*
Chinese First Office Action in related Chinese Application No. 200680055613.9, dated Feb. 11, 2011, five (5) pages.

*Primary Examiner* — Gregory Binda
*Assistant Examiner* — Josh Skroupa
(74) *Attorney, Agent, or Firm* — James E. Walton; Noah A. Tevis (57) ABSTRACT

A torque coupling for a rotor head of a rotary-wing aircraft is configured for rotation with a mast and for causing rotation of an attached yoke. The coupling has trunnions that rotate with the mast and extend generally radially. Pad-bearing assemblies each have a central member coupled to one of the trunnions with a laminated spherical bearing and have laminated pad bearings affixed to opposing sides of the central member. The laminated bearings have alternating rigid and elastomeric layers. A bearing mount is affixed to each pad bearing and is connected to a yoke for rotating the yoke with the mast. The pad-bearing assemblies allow for relative motion between each central member and the associated trunnion and between each central member and the bearing mounts through elastic shear deformation, and this allows for gimballing of the attached yoke relative to the mast.

3 Claims, 6 Drawing Sheets

U.S. PATENT DOCUMENTS

| | | | |
|---|---|---|---|
| 4,518,368 A * | 5/1985 | Peretti | 464/85 |
| 4,868,962 A * | 9/1989 | McArdle et al. | 416/134 A |
| 4,886,419 A * | 12/1989 | McCafferty | 416/134 A |
| 5,110,260 A * | 5/1992 | Byrnes et al. | 416/134 A |
| 5,145,321 A * | 9/1992 | Flux et al. | 416/134 A |
| 6,120,251 A * | 9/2000 | Garcin et al. | 416/134 A |
| 6,695,254 B2 * | 2/2004 | Zoppitelli et al. | |
| 7,387,574 B2 * | 6/2008 | Zimmermann et al. | 464/87 |
| 7,443,121 B2 * | 10/2008 | Nagai et al. | 464/85 |

* cited by examiner

ROTARY-WING AIRCRAFT TORQUE COUPLING WITH PAD BEARINGS

TECHNICAL FIELD

The present invention relates generally to torque couplings and relates particularly to torque couplings used in rotor heads of rotary-wing aircraft.

DESCRIPTION OF THE PRIOR ART

Rotor heads of rotary-wing aircraft, such as helicopters and tiltrotors, are rotated using a rotor mast. The rotor head typically consists of a yoke, torque coupling means for transferring torque from the mast to the yoke, and a plurality of blades attached to the yoke. The blades are often variable pitch blades, and various configurations of control mechanisms, which rotate with the rotor head, are used to control the blade pitch.

With many types of control mechanisms, the rotating controls need as much space as possible to achieve the most favorable control-system coupling terms. Because the rotating control system and the torque coupling means compete for space in the available volume, engineers must balance the desire for small size of the coupling means with the need for strength, which typically means larger components.

Although great strides have been made in the art of rotor heads, significant shortcomings remain.

SUMMARY OF THE INVENTION

There is a need for an improved torque coupling that provides for a reduced size and increased strength for transferring high torque.

Therefore, it is an object of the present invention to provide for a reduced size and increased strength for transferring high torque.

A torque coupling for a rotor head of a rotary-wing aircraft is configured for rotation with a mast and for causing rotation of an attached yoke. The coupling has trunnions that rotate with the mast and extend generally radially. Pad-bearing assemblies each have a central member coupled to one of the trunnions with a laminated spherical bearing and have laminated pad bearings affixed to opposing sides of the central member. The laminated bearings have alternating rigid and elastomeric layers. A bearing mount is affixed to each pad bearing and is connected to a yoke for rotating the yoke with the mast. The pad-bearing assemblies allow for relative motion between each central member and the associated trunnion and between each central member and the bearing mounts through elastic shear deformation of the elastomeric layers of the pad bearings, and this allows for gimballing of the attached yoke relative to the mast.

The present invention provides for several advantages, including: (1) reduced size; (2) reduced weight; and (3) the ability to transfer high torque.

BRIEF DESCRIPTION OF THE DRAWINGS

For a more complete understanding of the present invention, including its features and advantages, reference is now made to the detailed description of the invention taken in conjunction with the accompanying drawings in which.

DESCRIPTION OF THE PREFERRED EMBODIMENT

The present invention provides a high-torque coupling suitable for use in a rotor head of a tiltrotor aircraft, which is capable of vertical flight in a helicopter mode and forward flight in an airplane mode. The coupling of the invention provides for transmission of higher torque from a rotating mast to a rotor yoke while providing for relative motion of yoke at the required angles. The coupling of the invention is more compact than competing designs, allowing for favorable blade control system coupling terms and allowing for increased airspeed in airplane mode due to increased stability.

In the preferred embodiment, the torque coupling of the present invention uses laminated pad bearings and laminated spherical bearings to allow for the required rotational motion of the yoke relative to the mast. The pad bearings have a focus at the center of flapping and preferably have a chevron-shaped cross-section to improve the stability of the pad bearing, though other cross-sectional shapes can be used. Focusing the rigid layers of the pad bearing at the flapping axis greatly reduces the cocking motion in the spherical bearings. The improved design also reorients the spherical cocking to be concentric to a drive trunnion. These improvements allow this coupling to transmit the required torque while reducing the shear strains in the elastomeric components.

Figure 1:
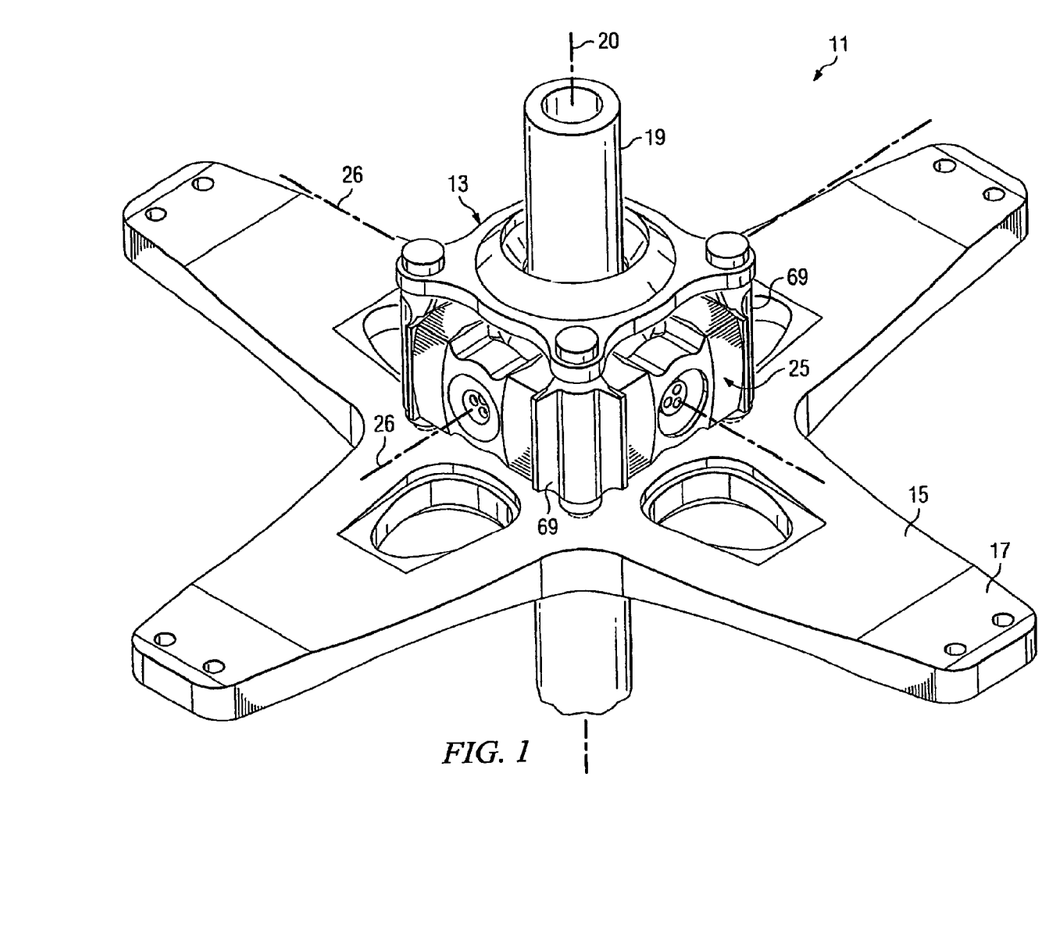
FIG. 1 is an oblique view of a rotor head incorporating a torque coupling according to a preferred embodiment of the present invention.
Figure 2:
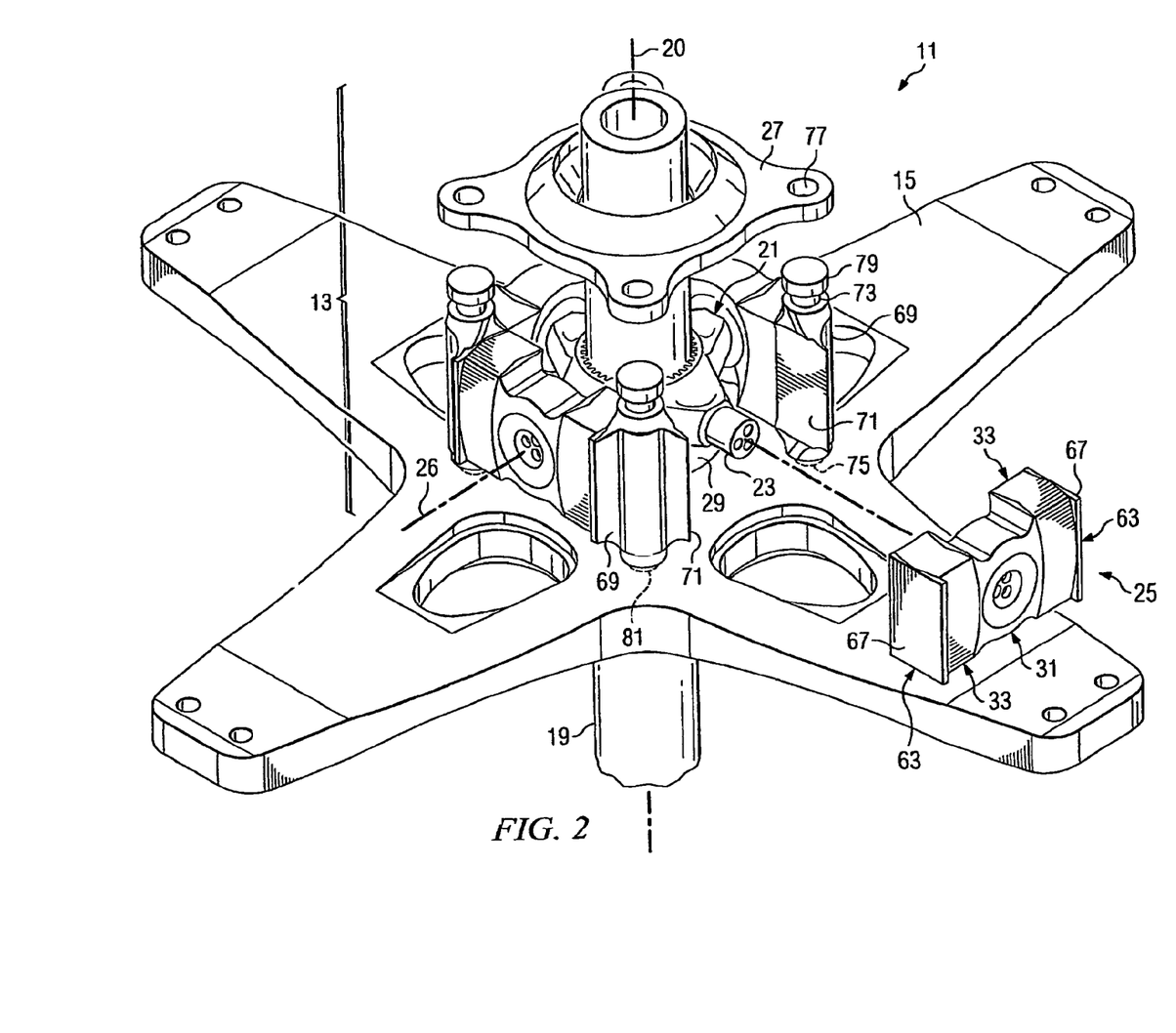
FIG. 2 is a partially exploded oblique view of the rotor head of FIG. 1.
Figure 3:
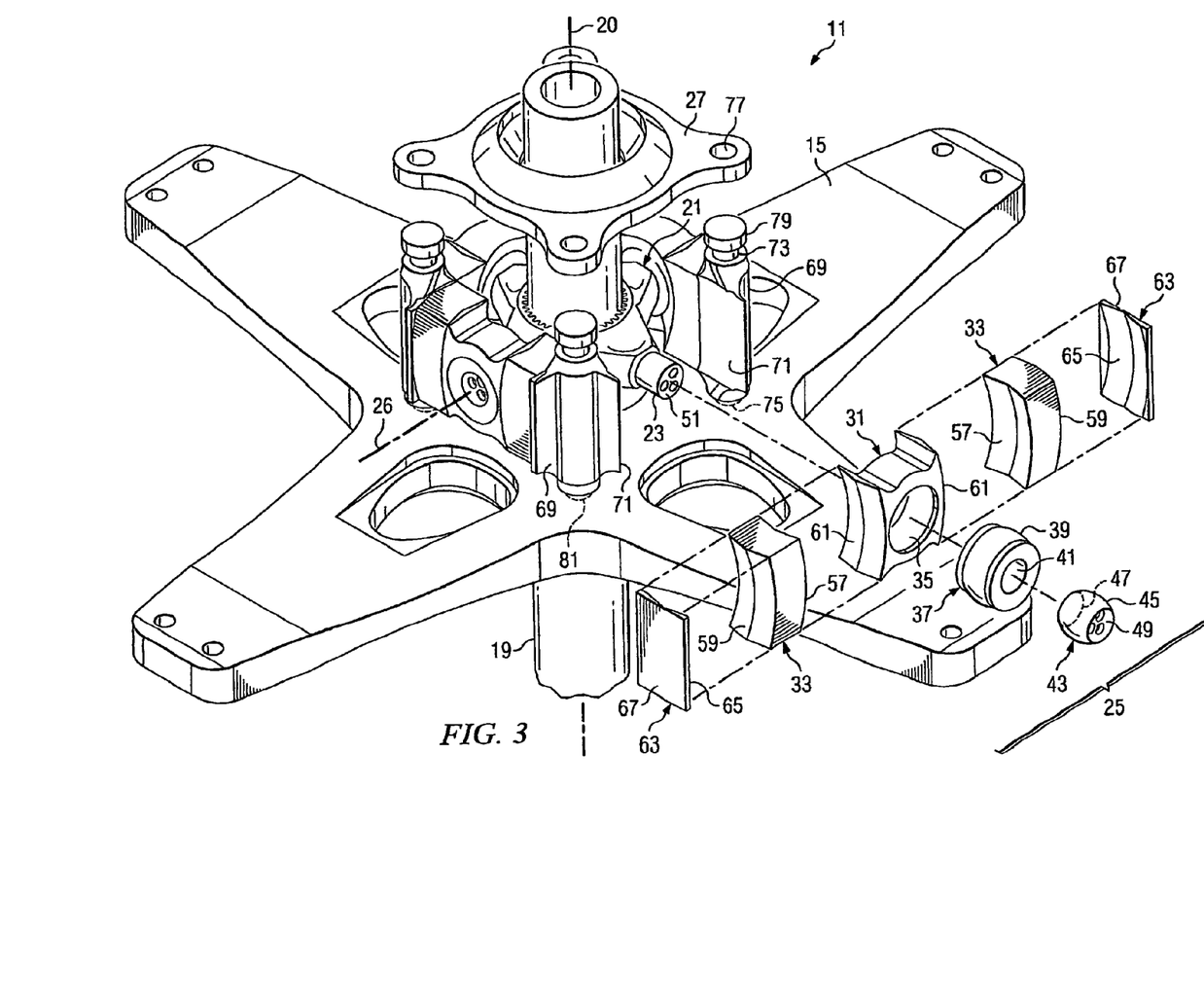
FIG. 3 is a partially exploded oblique view of the rotor head of FIG. 1.

Referring to the figures, FIG. 1 through 3 show a rotor head 11 for a tiltrotor aircraft, rotor head 11 incorporating a torque coupling 13 according to the present invention. Rotor head 11 comprises coupling 13 and a yoke 15 mounted to coupling 13 for rotation with coupling 13. Yoke 15 is configured to allow for rotor blades (not shown) to be attached to outer portions 17 of yoke 15. Rotor head 11 is shown assembled onto a rotor mast 19 for rotation of rotor head 11 when mast 19 is rotated about axis 20.

FIGS. 2 and 3 are views of rotor head 11 with coupling 13 shown partially exploded. Torque is transferred though a splined connection from mast 19 into trunnion carrier 21, which is preferably a unitary piece having four trunnions 23 extending radially from trunnion carrier 21. Torque is transferred from each trunnion 23 into one of a plurality of pad-bearing assemblies 25. The embodiment shown in FIGS. 1 through 3 comprises four pad-bearing assemblies 25, though rotor head 11 can be configured to have more or fewer assemblies 25. Each pair of opposing trunnions 23 forms a flapping axis 26, and the configuration of rotor head 11 allows for gimballing of yoke 15 about flapping axes 26 relative to trunnion carrier 21 and mast 19 while providing a constant path for torque from mast 19 to yoke 15. An upper hub spring 27 and a lower hub spring 29 are used to allow for gimballing and provide a centering force for rotor head 11. In the embodiment shown in the FIGS. 1 through 3, coupling 13 comprises four pad-bearing assemblies 25. Though only one pad-bearing assembly 25 is described below, the description applies to each one of assemblies 25.

Each pad-bearing assembly 25 comprises a rigid central member 31 and elastomeric pad bearings 33 affixed to central member 31 on opposing sides of central member 31. Central member 31 has a central bore 35 having an axis that is collinear with the corresponding flapping axis 26. Bore 35 is configured for installation of a spherical bearing 37 therein, spherical bearing 37 preferably being a laminated spherical bearing, though other types of bearings may be used. When spherical bearing 37 is installed in bore 25, an outer spherical surface 39 of bearing 37 is affixed to the inner wall of bore 35. Bearing 37 has a central bore 41 configured for installation of an inner member 43 therein. When inner member 43 is installed in bore 41, an outer spherical surface 45 is affixed to the inner wall of bore 41. Inner member 43 has a central bore 47 (shown in broken lines) configured to receive trunnion 23 and terminating at the outer end in an alignment pattern 49. Alignment pattern 49 is formed in inner member 43 for cooperative engagement with a corresponding alignment pattern 51 on the outer end of trunnion 23 for biasing inner member 43 toward a selected angular orientation relative to trunnion 23. This allows central member 31 to rotate a limited amount about trunnion 23 through elastic shear deformation of the elastomeric layers of spherical bearing 37.

Figure 4:
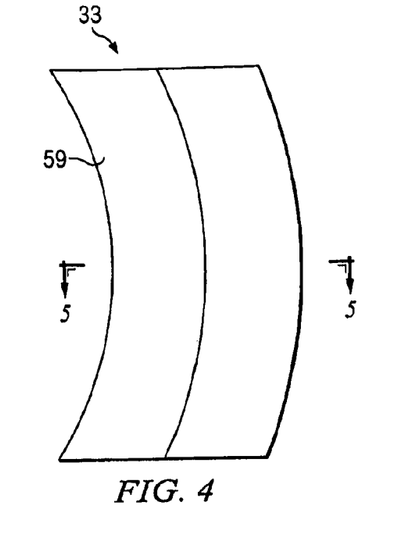
FIG. 4 is a side view of a pad bearing of the invention.
Figure 5:
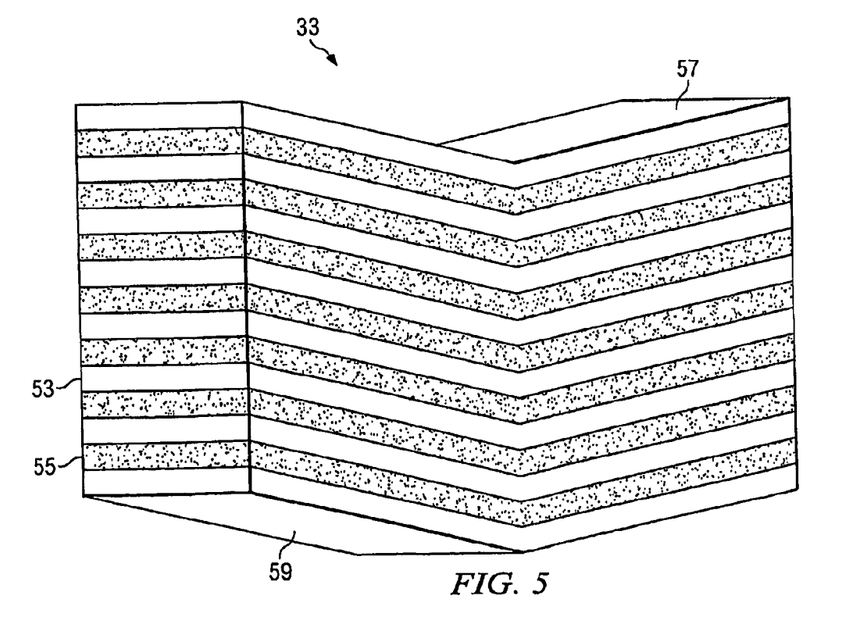
FIG. 5 is a is a cross-sectional top view of the pad bearing of FIG. 4 along the section line V-V.

Each pad-bearing assembly 25 has two pad bearings 33, and pad bearing 33 is shown in detail in FIGS. 4 and 5. Each of the pad bearings 33 in a pad-bearing assembly 25 is a mirror image of the other bearing 33 in the assembly 25. One pad bearing 33 is shown in FIGS. 4 and 5 and described below, though the description also applies to all pad bearings 33 in coupling 13. FIG. 4 is a side view of pad bearing 33 and shows that pad bearing 33 is formed to curve outward with a large radius of curvature, the foci lying on the corresponding flapping axis 26 when pad bearing 33 is installed in coupling 13. FIG. 5 is a cross-sectional view as viewed from the top and taken along the line V-V in FIG. 4. Pad bearing 33 is preferably a laminated bearing, comprising alternating rigid layers 53 and elastomeric layers 55 in a stacked arrangement, the outermost rigid layers forming an inner surface 57 and an outer surface 59. As shown in FIG. 5, pad bearing 33 is provided with a chevron-shaped, or V-shaped, cross-section for providing greater stability in pad bearing 33 as layers 53, 55 of pad bearing 33 are moved relative to each other through elastic shear deformation of elastomeric layers 55.

Referring again to FIGS. 1 through 3, inner surface 57 of each pad bearing 33 is adhered or otherwise affixed to one of a pair of bearing mount surfaces 61 of central member 31. Each bearing mount surface 61 has a chevron-shaped cross-section for engaging that of inner surface 57. A thrust plate 63 is adhered or otherwise affixed to each pad bearing 33, an inner surface 65 of thrust plate 63 being affixed to outer surface 59 of pad bearing 33. To mount pad-bearing assemblies within coupling 13, an outer surface 67 of each thrust plate 63 is adhered or otherwise affixed to a bearing mount 69.

Each bearing mount 69 is a rigid body and has a pair of planar, generally vertical bearing mount surfaces 71 that are formed to be generally perpendicular to each other. Bearing mount surfaces 71 of adjacent bearing supports 69 face each other for creating mounting locations for pad-bearing assemblies 25. Each bearing mount 69 has a vertical pin 73 extending from the upper end of mount 69 and a vertical pin 75 extending from the lower end of mount 69. Bearing mounts 69 are attached to upper hub spring 27 by pins 73 extending through holes 77, which are located on the periphery of upper hub spring 27. Each pin 73 is retained in hole 77 by cap 79.

Bearing mounts 69 are attached to yoke 15 by pins 75 extending through holes 81 in yoke 15. Alternatively, a vertical bore may be formed in each bearing mount 69, and a pin may extend through and beyond the ends of bearing mount 69 to form pins 73, 75.

Each pad bearing assembly 25 is installed between adjacent bearing mounts 69. To install bearing assembly 25, outer surface 67 of each thrust plate 63 is fixedly adhered or otherwise affixed to an adjacent bearing mount surface 71 of bearing mount 69. This configuration allows for limited relative movement between central member 31 and bearing mounts 69 through elastic shear deformation of elastomeric layers 55 of pad bearings 33. This, in turn, allows for gimballing of yoke 15 relative to mast 19 and trunnions 23 while providing a path for continuous transfer of torque from mast 19 to yoke 15.

When installed, each trunnion 23 engages inner member 43 of bearing 37, with each trunnion 23 engaging alignment pattern 49 formed in inner member 43 with a corresponding alignment pattern 51 on the outer end of trunnion 23. Each thrust plate 63 is affixed to a corresponding bearing mount surface 71 of each of a pair of bearing mounts 69, allowing torque to be transferred from trunnions 23 through inner members 43 and spherical bearings 37 into central members 31, and then through pad bearings 33 and thrust plates 63 into bearing mounts 69. The torque is then transferred from bearing mounts 69 into yoke 15 through pins 75 for rotating yoke 15 and attached rotor blades.

Figure 6:
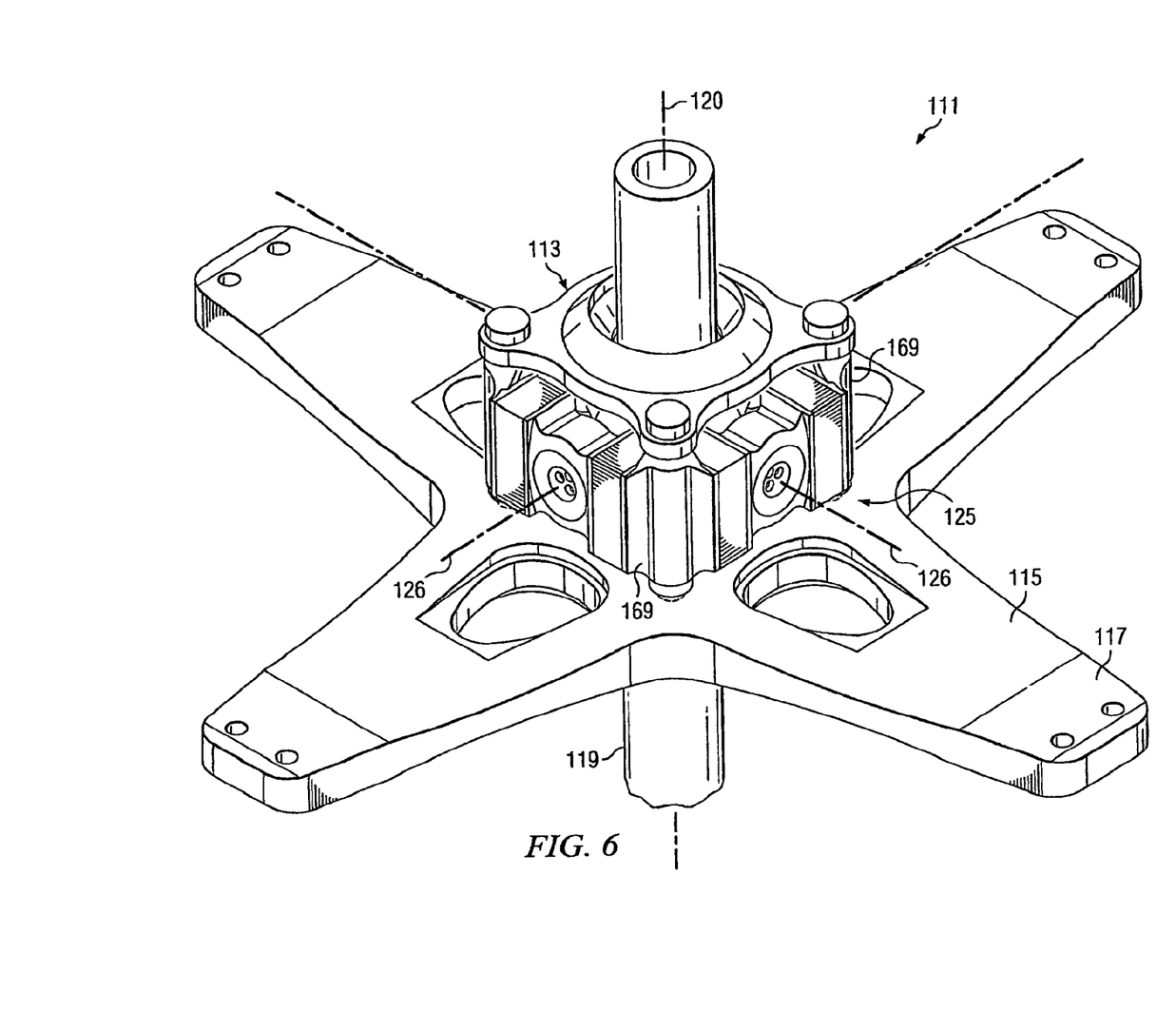
FIG. 6 is an oblique view of a rotor head incorporating an alternative embodiment of the torque coupling of the present invention.
Figure 7:
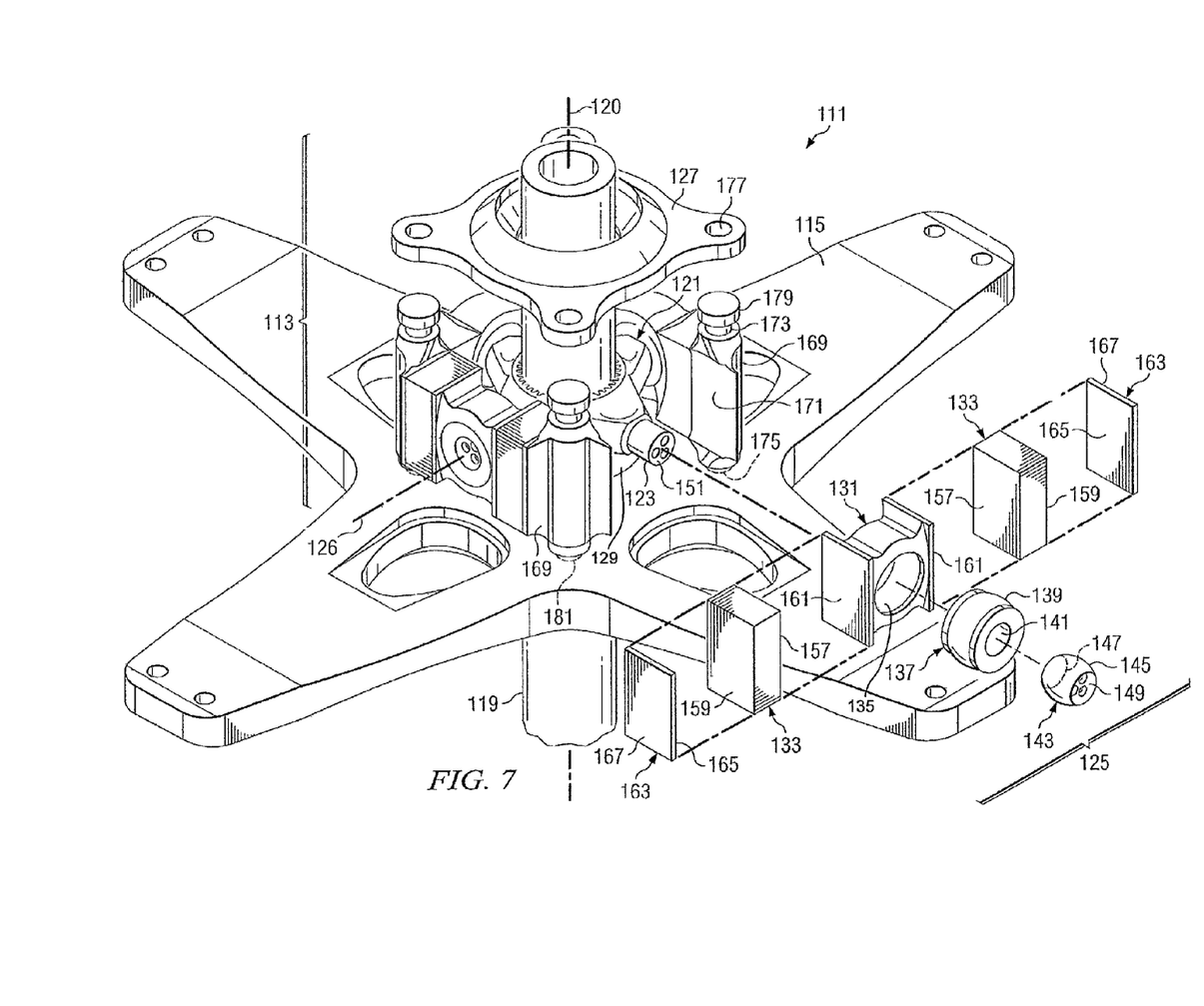
FIG. 7 is a partially exploded oblique view of the rotor head of FIG. 6.

FIGS. 6 and 7 illustrate a rotor head 111 incorporating an alternative embodiment of a torque coupling 113 of the present invention. FIG. 7 shows coupling 113 as partially exploded. Rotor head 111 has a configuration similar to that of rotor head 11, described above, and similar numbers are used to identify similar components. Rotor head 111 comprises coupling 113 and a yoke 115 mounted to coupling 113 for rotation with coupling 113. Yoke 115 is configured to allow for rotor blades (not shown) to be attached to outer portions 117 of yoke 115. Rotor head 111 is shown assembled onto a rotor mast 119 for rotation of rotor head 111 when mast 119 is rotated about axis 120.

Torque is transferred though a splined connection from mast 119 into trunnion carrier 121, which is preferably a unitary piece having four trunnions 123 extending radially from trunnion carrier 121. Torque is transferred from each trunnion 123 into one of a plurality of pad-bearing assemblies 125. The embodiment shown in FIGS. 6 and 7 comprises four pad-bearing assemblies 125, though rotor head 111 can be configured to have more or fewer assemblies 125. Each pair of opposing trunnions 123 forms a flapping axis 126, and the configuration of rotor head 111 allows for gimballing of yoke 115 about flapping axes 126 relative to trunnion carrier 121 and mast 119 while providing a constant path for torque from mast 119 to yoke 115. An upper hub spring 127 and a lower hub spring 129 are used to allow for gimballing and provide a centering force for rotor head 111. In the embodiment shown in the FIGS. 6 and 7, coupling 113 comprises four pad-bearing assemblies 125. Though only one pad-bearing assembly 125 is described below, the description applies to each one of assemblies 125.

Each pad-bearing assembly 125 comprises a rigid central member 131 and elastomeric pad bearings 133 affixed to central member 131 on opposing sides of central member 131. Pad bearings 133 are preferably laminated bearings, with alternating rigid and elastomeric layers in a stacked arrangement. The layers of pad bearings 133 are generally planar and lack the chevron-shaped cross-section of pad bearings 33. Central member 131 has a central bore 135 having an axis that is collinear with the corresponding flapping axis 126.

Bore 135 is configured for installation of a spherical bearing 137 therein, spherical bearing 137 preferably being a laminated spherical bearing, though other types of bearings may be used. When spherical bearing 137 is installed in bore 125, an outer spherical surface 139 of bearing 137 is affixed to the inner wall of bore 135. Bearing 137 has a central bore 141 configured for installation of an inner member 143 therein. When inner member 143 is installed in bore 141, an outer spherical surface 145 is affixed to the inner wall of bore 141. Inner member 143 has a central bore 147 (shown in broken lines) configured to receive trunnion 123 and terminating at the outer end in an alignment pattern 149. Alignment pattern 149 is formed in inner member 143 for cooperative engagement with a corresponding alignment pattern 151 on the outer end of trunnion 123 for biasing inner member 143 toward a selected angular orientation relative to trunnion 123. This allows central member 131 to rotate a limited amount about trunnion 123 through elastic shear deformation of the elastomeric layers of spherical bearing 137.

Inner surface 157 of each pad bearing 133 is adhered or otherwise affixed to one of a pair of bearing mount surfaces 161 of central member 131. A thrust plate 163 is adhered or otherwise affixed to each pad bearing 133, an inner surface 165 of thrust plate 163 being affixed to outer surface 159 of pad bearing 133. To mount pad-bearing assemblies within coupling 113, an outer surface 167 of each thrust plate 163 is adhered or otherwise affixed to a bearing mount 169.

Each bearing mount 169 is a rigid body and has a pair of planar, generally vertical bearing mount surfaces 171 that are formed to be generally perpendicular to each other. Bearing mount surfaces 171 of adjacent bearing supports 169 face each other for creating mounting locations for pad-bearing assemblies 125. Each bearing mount 169 has a vertical pin 173 extending from the upper end of mount 169 and a vertical pin 175 extending from the lower end of mount 169. Bearing mounts 169 are attached to upper hub spring 127 by pins 173 extending through holes 177, which are located on the periphery of upper hub spring 127. Each pin 173 is retained in hole 177 by cap 179. Bearing mounts 169 are attached to yoke 115 by pins 175 extending through holes 181 in yoke 115. Alternatively, a vertical bore may be formed in each bearing mount 169, and a pin may extend through and beyond the ends of bearing mount 169 to form pins 173, 175.

Each pad bearing assembly 125 is installed between adjacent bearing mounts 169. To install bearing assembly 125, outer surface 167 of each thrust plate 163 is fixedly adhered or otherwise affixed to an adjacent bearing mount surface 171 of bearing mount 169. This configuration allows for limited relative movement between central member 131 and bearing mounts 169 through elastic shear deformation of elastomeric layers of pad bearings 133. This, in turn, allows for gimballing of yoke 115 relative to mast 119 and trunnions 123 while providing a path for continuous transfer of torque from mast 119 to yoke 115.

When installed, each trunnion 123 engages inner member 143 of bearing 137, with each trunnion 123 engaging alignment pattern 149 formed in inner member 143 with a corresponding alignment pattern 151 on the outer end of trunnion 123. Each thrust plate 163 is affixed to a corresponding bearing mount surface 171 of each of a pair of bearing mounts 169, allowing torque to be transferred from trunnions 123 through inner members 143 and spherical bearings 137 into central members 131, and then through pad bearings 133 and thrust plates 163 into bearing mounts 169. The torque is then transferred from bearing mounts 169 into yoke 115 through pins 175 for rotating yoke 115 and attached rotor blades.

The present invention provides for several advantages, including: (1) reduced size; (2) reduced weight; and (3) the ability to transfer high torque.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A torque coupling for a rotor head of a rotary-wing aircraft, the torque coupling being configured for rotation with a mast and for causing rotation of an attached yoke; the coupling comprising:

a plurality of pairs of trunnions adapted for rotation with the mast about an axis of rotation, each trunnion in a single pair forming a flapping axis by being located opposingly such that the flapping axis is located through a center axis of each of the trunnions within the single pair, the trunnions extending generally radially relative to the axis of rotation;

a plurality of pad-bearing assemblies, each assembly comprising:
    a central member pivotally coupled to each trunnion;
    a laminated spherical bearing located in each central member;
    a plurality of laminated pad bearings affixed to opposing sides of the central member, each pad bearing comprising a plurality of rigid layers and a plurality of elastomeric layers in a stacked configuration, at least one elastomeric layer being located between adjacent rigid layers, wherein each pad bearing is curved such that a focus of the curvature of each pad bearing lies on the corresponding flapping axis located through the corresponding central member so as to at least partly orient any spherical cocking of each spherical bearing to be concentric with each corresponding trunnion; and a bearing mount affixed to at least one pad bearing and adapted to be connected to a yoke;

wherein the pad-bearings allow for relative motion between each central member and the associated bearing mounts through elastic shear deformation of the elastomeric layers of the pad bearings, which allows for relative motion between an attached yoke and the mast.

2. The torque coupling according to claim 1, further comprising:

wherein each trunnion is pivotally coupled to an associated central member with the spherical bearing.

3. The torque coupling according to claim 1, wherein the torque coupling comprises a plurality of bearing mounts, wherein each bearing mount has at least two mounting surfaces that are generally vertical and generally perpendicular to each other, and wherein at least one pad-bearing assembly is attached to an opposing pair of bearing mounts.

* * * * *